United States Patent [19]

Gerritsen

[11] 4,110,061

[45] Aug. 29, 1978

[54] PERISTALTIC PUMP HAVING PARTICULARLY REINFORCED HOSE

[76] Inventor: Jan Willem Gerritsen, Raadhuisstraat 75a, Alphen an der Rijn, Netherlands

[21] Appl. No.: 764,407

[22] Filed: Jan. 31, 1977

[30] Foreign Application Priority Data

Feb. 24, 1976 [NL] Netherlands ............... 7601867

[51] Int. Cl.² ............... F04B 43/18; F04B 43/12; F04B 45/06
[52] U.S. Cl. ............... 417/477; 138/137
[58] Field of Search ............... 417/477, 476; 138/124, 138/125, 126, 127, 137, 138

[56] References Cited

U.S. PATENT DOCUMENTS

| | | | |
|---|---|---|---|
| 1,425,148 | 8/1922 | Subers | 138/137 |
| 2,515,929 | 7/1950 | Ofeldt | 138/137 |
| 3,887,306 | 6/1975 | Gerritsen | 417/477 |

FOREIGN PATENT DOCUMENTS 594,463  6/1959  Italy ............... 417/477

Primary Examiner—Carlton R. Croyle
Assistant Examiner—Thomas I. Ross
Attorney, Agent, or Firm—Weingarten, Maxham & Schurgin

[57] ABSTRACT

A peristaltic pump, in particular for pumping concrete, cement, and other mixtures containing liquid. The pump has a hose having layers of helically wound reinforcing threads embedded in the wall thereof. The angle of pitch of the windings in one layer is opposite to that in the other layer. The hose is fastened at the delivery end, and the angle of crossing, opening in the longitudinal direction of the hose, between the windings in the different layers is larger than the equilibrium angle.

9 Claims, 3 Drawing Figures

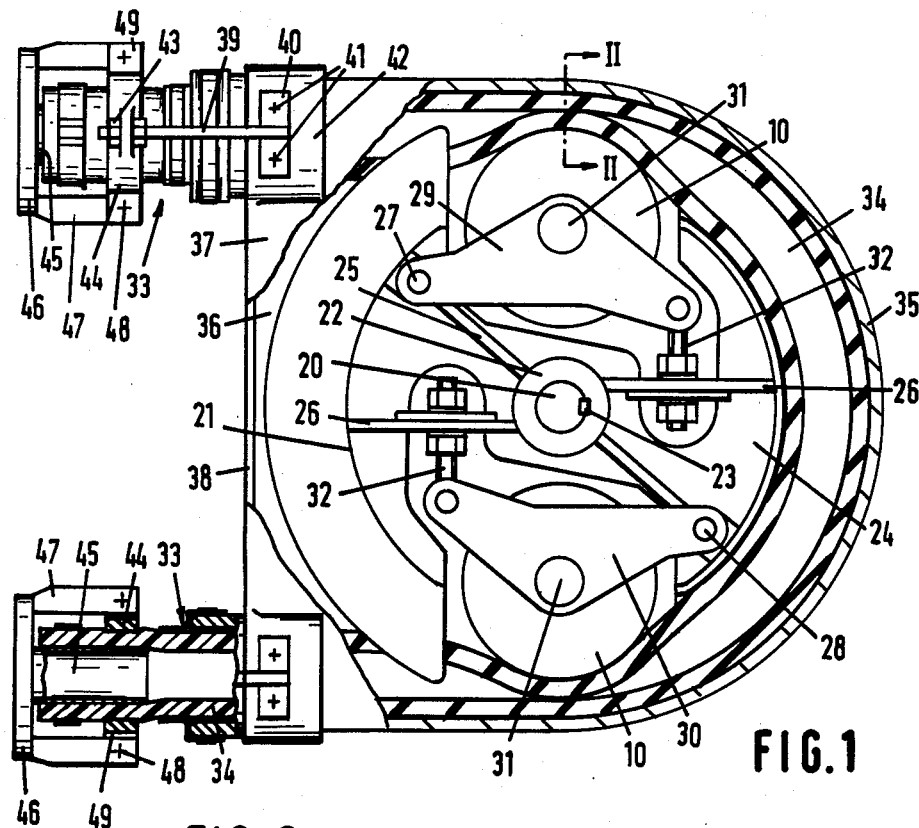

PERISTALTIC PUMP HAVING PARTICULARLY REINFORCED HOSE

This invention relates to a peristaltic pump.

A well-known kind of peristaltic pump comprises a support track curved according to an arc of a circle located concentrically about a central shaft, a pump hose curved into contact with said support track and fastened at one end, and compression members arranged to be driven in successive spaced relationship in a circular path located around, and concentric with, said central shaft, said compression members being spaced radially inwardly from said arcuate support track so as to be capable of locally squeezing the pump hose shut, said pump hose having at least two layers of reinforcing threads consisting of windings extending in the peripheral direction of the hose and embedded in the wall thereof, the windings in the two layers extending obliquely to the longitudinal direction of the pump hose so that the reinforcing threads of one layer cross those of the other.

The term thread as used herein is intended to mean any threadlike filament, especially of suitable strong material, such as steel wire.

Peristaltic pumps are being used for various purposes and in various forms. Especially when high delivery pressures are to be produced with such a pump, such as in pumping concrete, cement and like mixtures over a considerable elevation, or in pumping fluids in industrial plants, the pump hose must be provided with a reinforcement, often designed as described above. The angle of crossing between the windings of the two layers of reinforcing threads is so selected that, under the influence of internal overpressure, the pump hose does not tend to become longer, and does not tend to increase in diameter either. This angle is called the angle of equilibrium. Calculation and practice have shown that the angle of equilibrium, rounded off to the nearest whole degree, is 108°. Normally, the layers are made symmetrical for balancing tensional effects, so that the angle of equilibrium may also be defined as being 54° for each layer, measured between the longitudinal direction of the pump hose and the windings. The windings commonly consist of steel wires, preferably twisted multifilament steel wires, wound helically clockwise and counterclockwise in the respective layers. Other materials are also suitable for the reinforcing threads. As an alternative it has been proposed to use closely spaced rings, using the same angle of equilibrium, instead of the helical windings.

Despite the reinforcement with reinforcing threads crossing each other at the angle of equilibrium, such a pump hose involves great difficulties at high delivery pressures. The compression members, commonly rotatable rollers, in passing over the hose and squeezing it shut, exercise a large dragging force on the hose, which on the one hand causes the hose to change in length all the same, and on the other hand necessitates special measures for restraining the hose. For this reason the hose is fastened at the end where the rollers begin to run on it. It has also been proposed to use driven rollers, and various proposals have been made to provide the hose with additional longitudinal reinforcing threads. Driven compression rollers considerably complicate the machine, and fail to provide an effective solution; a longitudinal reinforcement makes the hose stiff and its adhesive bond with the material of the hose wall inevitably gives way after some service period, so that the hose must often be replaced.

It is an object of the present invention to provide a peristaltic pump whereby the above and other objections and drawbacks are avoided in a rational manner.

According to the present invention, there is provided in a peristaltic pump comprising a support track curved according to an arc of a circle located concentrically about a central shaft, a pump hose curved into contact with said support track and fastened at one end, and compression members arranged to be driven in successive spaced relationship in a circular path located around, and concentric with, said central shaft, said compression members beings spaced radially inwardly from said arcuate support track so as to be capable of locally squeezing the pump hose shut, said pump hose having at least two layers of reinforcing threads consisting of windings extending in the peripheral direction of the hose and embedded in the wall thereof, the windings in the two layers extending obliquely to the longitudinal direction of the pump hose, so that the reinforcing threads of one layer cross those of the other, the improvement which comprises that the angle of crossing between the windings of the two layers of reinforcing threads deviates from the equilibrium angle, as defined herein, so that the pump hose tends to be elongated under the influence of internal delivery pressure, and that the pump hose is fastened at the end to which said compression members move along said support track.

In the pump according to the present invention, the dragging force of the leading compression member on the hose and the elongating force active between said compression member and the fastened hose end counteract each other. As a consequence, when the angle of deviation between the angle of crossing and the angle of equilibrium is suitably selected, the hose lies virtually immovably against the support track without special restraining means being required. It is even unnecessary to fasten the other end of the curved hose portion for restraining it. This quiet behaviour of the hose applies to all delivery pressures, up to the highest pressure for which the pump is designed.

Additional advantages are the greater flexibility of the hose owing to the fact that the angle of crossing opening in the longitudinal direction of the hose is larger. This increases the suction power of the hose portion located behind the active compression member, which after the passage thereof resumes it round cross-sectional form. Another advantage is the relatively low cost price, as the complication of restraining means is avoided and longitudinal reinforcement of the hose is unnecessary. If, for special purposes, longitudinal reinforcement is applied all the same, its bonding to the material of the hose will last considerably longer owing to the improved behaviour of the hose.

The improved behaviour of the hose makes for the possibility of using compression members not rotating around their own shaft, and immersing the same, along with the pump hose, in a lubricating bath, for example, a glycerine bath. A lubricating bath is also beneficial in cases where the compression members do rotate around their own shaft.

One embodiment of the invention will now be described, by way of example, with reference to the accompanying diagrammatic drawings, in which FIG. 1 is a side-elevational view of a peristaltic pump according to the present invention with a cover plate largely broken away, and showing the pump hose in longitudinal section;

FIG. 2 illustrates, on a larger scale, a cross-sectional view of the pump hose shown in FIG. 1; and FIG. 3 shows, on the same scale as FIG. 2, a portion of the wall of the pump hose in the uncurved state and in longitudinal section.

Referring to the drawings, in FIG. 1 there is shown a central shaft 20 on which a support structure 21 with a hub 22 is fastened and keyed to it for rotation along with it with a key 23. Structure 21 further comprises a disk member 24 with ridges 25 and 26. Pivoted at 27 and 28 are support plates 29 and 30 journalling shafts 31 of compression rollers 10, which are each adjustable with an adjusting bolt 32 supported in one of the ridges 26. A pump hose 34 is fastened in sleeve structures generally indicated at 33, and curved into contact with an arcuate support track 35 formed integrally with a bottom plate 36. A cover plate, partly broken away for clarity, is shown at 37, and a cross-wall at 38. Sleeve structures 33 are fastened with clamping bolts 39, secured with welded-on plates 40 and bolts 41 to elevations 42 of the bottom and cover plates, bolts 39 are connected with bolts 43 to a heavy hose clip 44. Inserted in each end of hose 34 is a pipe 45, to which a flange 46 is welded, which with welded-on rods 47 and tap bolts 48 is connected to lugs 49 formed on hose clips 44.

As both ends of hose 34 are fastened by means of a sleeve structure 33, the pump can work in both directions of rotation. When rollers 10 pass support track 35, they locally squeeze rubber hose 34 shut, thereby driving up the material within the hose ahead of it in the direction of rotation. At the trailing side of the roller the hose resumes its round cross-sectional form, thereby drawing fresh material into the hose.

As a roller 10 passes over the curved portion of hose 34, irrespective of the delivery pressure to be supplied, hose 8 does not substantially change in position, and not in form either, save the local compression by the roller. This outstanding behaviour is the result of the reinforcement embedded in the wall of hose 34.

In FIGS. 2 and 3, the location of some windings of the reinforcement is shown in dash lines. The reinforcement consists of two layers 52 and 53, with layer 53 being located within layer 52. Both layers 52 and 53 consist of helically wound steel wire, embedded in the material of the hose throughout the length of the latter. The windings extend obliquely to the longitudinal direction of the hose so that the windings of the two layers cross each other at an angle opening in the longitudinal direction of the hose of 126°, which has been found to be effective for the purpose. The windings of the two layers are inclined in the same degree, so that in the non-curved state of the hose, all windings enclose an angle of 63° with the longitudinal direction of the hose, indicated by arrow 54. When the hose is curved, and angle of crossing between the windings remains practically unchanged.

The layers of reinforcement are spaced some radial distance from each other to prevent the rubber from becoming overloaded in the regions of the crossings between the windings.

Owing to the fact that the angle of crossing between the windings of the reinforcement is larger than the so-called equilibrium angle of 108°, hose 34 tends to be elongated as a result of the pressure prevailing therein in the portion between sleeve structure 33 and the oncoming roller 10, which tendency is compensated by the forces which the oncoming roller 10 and sleeve structure 33 exercise on that portion of the hose in the longitudinal direction thereof. As the tendency of elongation and the said forces increase proportionally to the delivery pressure, this compensation takes place at any delivery pressure.

The sleeve structure 33 at the intake end of hose 34 does not play a role in this compensation. However, the embodiment employing two sleeve structures 33 makes the pump suitable for operation in both directions of rotation.

I claim:

1. In a peristaltic pump comprising a support track curved according to an arc of a circle located concentrically about a central shaft, a pump hose curved into contact with said support track and fastened at one end, and compression members arranged to be driven in successive spaced relationship in a circular path located around, and concentric with, said central shaft, said compression members being spaced radially inwardly from said arcuate support track so as to be capable of locally squeezing the pump hose shut, said pump hose having at least two layers of reinforcing threads consisting of windings extending in the peripheral direction of the hose and embedded in the wall thereof, the windings in the two layers extending obliquely to the longitudinal direction of the pump hose, so that the reinforcing threads of one layer cross those of the other, the improvement which comprises that the angle of crossing between the windings of the two layers of reinforcing threads is larger than the equilibrium angle, so that the pump hose tends to be elongated under the influence of internal delivery pressure, and that the pump hose is fastened at the end to which said compression members move along said support track.

2. A peristaltic pump according to claim 1, wherein the angle of crossing between the windings of the two layers of reinforcing threads opening in the longitudinal direction of the hose is larger than 120°.

3. A peristaltic pump according to claim 2, wherein said angle is 126° to 128°.

4. A peristaltic pump according to claim 1, wherein the pump hose has circumferentially extending reinforcing wires only.

5. A peristaltic pump according to claim 1, wherein the pump hose and the compression members are immersed in a lubricant bath, such as a glycerine bath.

6. A pump hose for a peristaltic pump, said hose adapted to be acted upon by pump compression members, said hose having at least two layers of reinforcing threads consisting of windings extending in the peripheral direction of the hose and embedded in the wall thereof, the windings in the two layers extending obliquely to the longitudinal direction of the pump hose, so that the reinforcing threads of one layer cross those of the other and the angle of crossing between the windings of the two layers of reinforcing threads being larger than the equilibrium angle.

7. The pump hose of claim 6 wherein said angle of crossing is larger than 120°.

8. The pump hose of claim 6 wherein said angle of crossing is between 126° and 128°.

9. The pump hose of claim 6 having circumferentially extending reinforcing wires.

* * * * *